US011157566B2

(12) United States Patent
Ramraj

(10) Patent No.: US 11,157,566 B2
(45) Date of Patent: Oct. 26, 2021

(54) REAL TIME EXCHANGE OF UPDATE INFORMATION OVER A NETWORK USING WEB SOCKETS COUPLED TO A MESSAGE QUEUE

(71) Applicant: Afilias Limited, Dublin (IE)

(72) Inventor: Rishi Ramraj, Toronto (CA)

(73) Assignee: AFILIAS LIMITED, Dublin (IE)

(*) Notice: Subject to any disclaimer, the term of this patent is extended or adjusted under 35 U.S.C. 154(b) by 206 days.

(21) Appl. No.: 16/557,146

(22) Filed: Aug. 30, 2019

(65) Prior Publication Data
US 2021/0064671 A1    Mar. 4, 2021

(51) Int. Cl.
*G06F 16/903* (2019.01)
*H04L 29/12* (2006.01)
*G06F 16/23* (2019.01)
*H04L 29/08* (2006.01)
*H04L 29/06* (2006.01)

(52) U.S. Cl.
CPC .... *G06F 16/90335* (2019.01); *G06F 16/2379* (2019.01); *H04L 61/1511* (2013.01); *H04L 67/32* (2013.01); *H04L 67/26* (2013.01); *H04L 67/42* (2013.01)

(58) Field of Classification Search
CPC ..... H04L 61/1511; H04L 67/32; H04L 67/42; H04L 67/26; G06F 16/24568; G06F 16/90335; G06F 16/2379
See application file for complete search history.

(56) References Cited

U.S. PATENT DOCUMENTS

| | | | |
|---|---|---|---|
| 2012/0254221 A1 | 10/2012 | Lai et al. | |
| 2019/0121498 A1* | 4/2019 | Jakobovits | G06F 3/0481 |
| 2019/0238424 A1* | 8/2019 | Guan | H04L 41/5041 |
| 2020/0311680 A1* | 10/2020 | Wahl | G06F 16/90335 |

OTHER PUBLICATIONS

Madden S., et al. "Fjording the stream: An Architecture for Queries over Streaming Sensor Data", *University of California, Berkeley; Proceedings 18th. International Conference on Data Engineering.* (ICDE 2002). San Jose, CA, Feb. 26-Mar. 1, 2002; [International Conference on Data Engineering. (ICDE)], Los Alamitos, CA •IEEE Comp. Soc, US, vol. Conf. 18, Feb. 26, 2002, pp. 555-566.

(Continued)

*Primary Examiner* — Frantz B Jean
(74) *Attorney, Agent, or Firm* — Haynes and Boone, LLC

(57) ABSTRACT

A system and method as a web socket configuration for providing access to a remote storage database by a network client device over a communications network, the database containing event driven data, the server including: an interface to the database containing the event driven data; a message queue for receiving and storing updates of the event driven data of the database; and a computer processor to establish websocket connection with the network client device upon request to provide a persistent network connection between the server and the network client device; wherein the update data is associated with the requested portion of the event driven data such that the update data represents a data subset of the requested portion.

12 Claims, 2 Drawing Sheets

(56) References Cited

OTHER PUBLICATIONS

Cosmina, Ivan: "A web based Publish-Subscribe framework for mobile computing", *International Journal of Advanced Computer Science and Applications*, vol. 5, No. 4, Jan. 1, 2014.

Roffia, Luca et al.: "Dynamic Linked Data: A SPARQL Event Processing Architecture", *Future Internet*, Apr. 20, 2018 (Apr. 20, 2018), p. 36, XP055756767, DOI: 10.3390/fi10040036, Retrieved from the Internet: URL:http://www/mdpi.com/1999-5903/10/4/36/htm [retrieved on Dec. 4, 2020].

* cited by examiner

REAL TIME EXCHANGE OF UPDATE INFORMATION OVER A NETWORK USING WEB SOCKETS COUPLED TO A MESSAGE QUEUE

FIELD

The present invention relates to computer networks and methods, and more particularly to the provision of update data.

BACKGROUND

Access to large data sets over a communications network can be complicated and computationally intensive due to pulling of entire tabular data sets. Also, for entire data sets, the ability to provide for real time access to incremental changes in particular data portions of the data sets can be problematic.

Typically in today's world, a network client is disadvantaged in that the client must re-query for modifications or updates to their previously requested data. The need to re-query come with data access performance penalties, such as unnecessarily receiving data that does not contain any current changes, as well as real time data access delays depending upon the size of the full data set. Further, the client must anticipate when changes to the data are expected, or otherwise frequently (e.g. on a regular schedule) query a data source for the data.

SUMMARY

The present invention can provide a server and method of providing update data to obviate or mitigate at least one of the above presented disadvantages.

A first aspect provided is a server having a web socket configuration for providing access to a remote storage database by a network client device over a communications network, the database containing event driven data, the server including: an interface to the database containing the event driven data; a message queue for receiving and storing updates of the event driven data of the database; a computer processor and memory having stored instructions for execution by the computer processor to: establish by the computer processor a websocket connection with the network client device upon request of the network client device, the websocket connection providing a persistent network connection between the server and the network client device for communicating network messages; link by the computer processor a set of instructions as a coupling program providing a direct coupling between the message queue and the websocket connection; receive by the computer processor a query request from the network client device for a requested portion of the event driven data, apply the query request to the database and send a query response containing the requested portion of the event driven data to the network client device, contents of the query response representing historical event driven data; subsequent to said send the query response, operate by the computer processor the coupling program such that update data of the event driven data resident in the message queue is passed to the websocket connection and sent to the network client device as an update data message containing the update data representing real-time changes to the historical event driven data; wherein the update data is associated with the requested portion of the event driven data such that the update data represents a data subset of the requested portion.

A further aspect provided is a method implemented using a web socket configuration to provide access to a remote storage database by a network client device over a communications network, the database containing event driven data, the method including: interfacing to the database containing the event driven data; receiving and storing updates of the event driven data of the database in a message queue; establishing by a computer processor a web socket connection with the network client device upon request of the network client device, the web socket connection providing a persistent network connection between the server and the network client device for communicating network messages; linking by the computer processor a set of instructions as a coupling program providing a direct coupling between the message queue and the websocket connection; receiving by the computer processor a query request from the network client device for a requested portion of the event driven data, apply the query request to the database and send a query response containing the requested portion of the event driven data to the network client device, contents of the query response representing historical event driven data; and subsequent to said send the query response, operating by the computer processor the coupling program such that update data of the event driven data resident in the message queue is passed to the websocket connection and sent to the network client device as an update data message containing the update data representing real-time changes to the historical event driven data; wherein the update data is associated with the requested portion of the event driven data such that the update data represents a data subset of the requested portion.

DESCRIPTION OF FIGURES

Exemplary embodiments of the invention will now be described in conjunction with the following drawings, by way of example only, in which.

DETAILED DESCRIPTION

System 8

Figure 1:
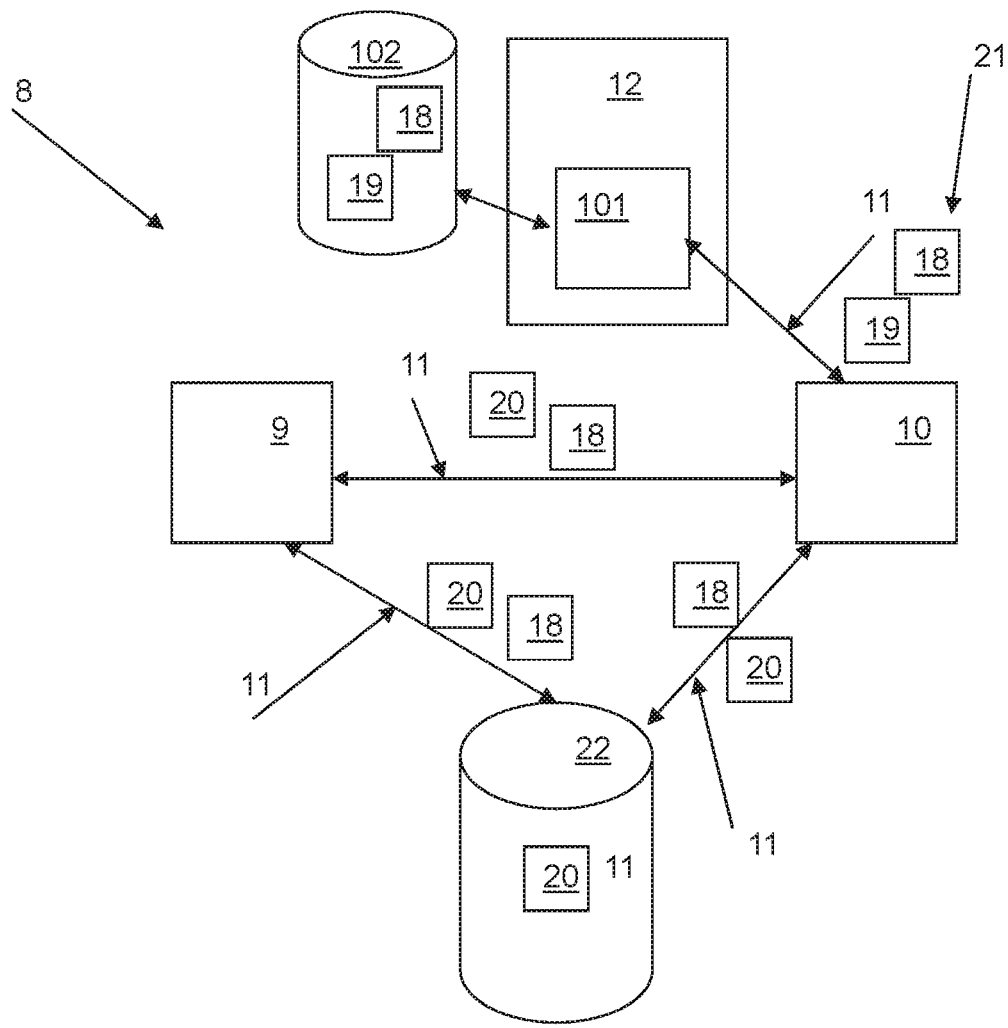
FIG. 1 is a block diagram of components of a network system.

Referring to FIG. 1, shown is a data retrieval system 8 for optimizing Extract Transform and Load (ETL) for event driven data 20 stored in a database 22. The extraction of the ETL process involves extracting the event driven data 20 from the source system(s) (i.e. database(s) 22) by a data server 10. It is recognized that the data server 10 can combine data from different source databases 22. Each separate database 22 can also use a different data organization and/or format. The transform of the ETL process can be implemented by the data server 10 using a series of rules or functions applied to the extracted data in order to prepare it for loading into the end target, in this case a network client device 12 (e.g. one of a plurality of network client devices 12) coupled to the data server 10 over a communications network 11. The network client device 12 has a network application 101 (e.g. Web browser) for requesting, receiving and consuming of the event driven data 20 as target data 21 as further described below.

Examples of event driven data 20 can data used be as a way to provide business analytics data to a web browser (e.g. network client device 12) over the network 11. The network client device 12 can have an interface (e.g. graphical user interface) used in displaying the event driven data 20 to a user of the network client device 12, as well as displaying (when received) update data 18 to the event driven data 20. As such, as further described below, the update data 18 is defined as specific portion(s) of the previously provided event driven data 20 that included changes/modifications to the originally supplied event driven data 20 (as well as to previously suppled update data 18).

For example, the event driven data 20 can represent Domain Name registration transactions, such that the network client device 12 can monitor changes (e.g. in real time) those transactions as the update data 18 arrives from the data server 10 (i.e. using a coupling program 62 to couple contents of a message queue 56 with a web socket 60 connecting the network client device 12 to the data server 10 over the network 11), as further described below.

Other examples for receiving and displaying the event driven data 20 (and the subsequent update data 18) can be for monitoring other EPP specific traffic data, for example to monitor (by the network client device 12) a domain name registration marketing program or for implementing any kind of security threat monitoring/analysis of EPP related data.

It is recognized that during the transform process, some event driven data 20 extracted from the database 22 may not need any transformation at all, as such data is known as "direct move" or "pass through" data 21. One function of transformation is the cleaning of the extracted data, which aims to pass only "proper" data 21 to the target (the network client device 12). Examples of the transformation process can include operations such as but not limited to: filtering of data to exclude one or more data types from the target data 21; selecting only certain portions (e.g. columns to load or selecting null columns not to load); translating coded values; encoding free-form values; filtering out identified sensitive information from the data 21 content (e.g. event driven data unauthorized for a user account of the system 8 used by the specific network client device); deriving a new calculated value; sorting or ordering the data to improve search performance; joining data from multiple sources; aggregating; transposing or pivoting; splitting a column or row into multiples; and looking up and validating relevant data from tables or referential files; applying any form of data validation. The load process is implemented by the data server 10 to respond to a data request from the network client device 12 by supplying the transformed event driven data 20 as target data 21 over the communications network 11. It is also recognized that the target data 21 can be historical data 19 as well as update data 18, as further described below, such that the update data 18 contains content for use by the network application 101 to modify (e.g. add, delete, change) contents of the historical data 19 received by the network client device 12 previous to the update data 18. Preferably the historical data 19 is received from the data server 10 by the network client device 12 upon request (i.e. a typical pull operation), while the update data 18 is pushed (i.e. a typical push operation) from the data server 10 to the client network device 12.

Figure 2:
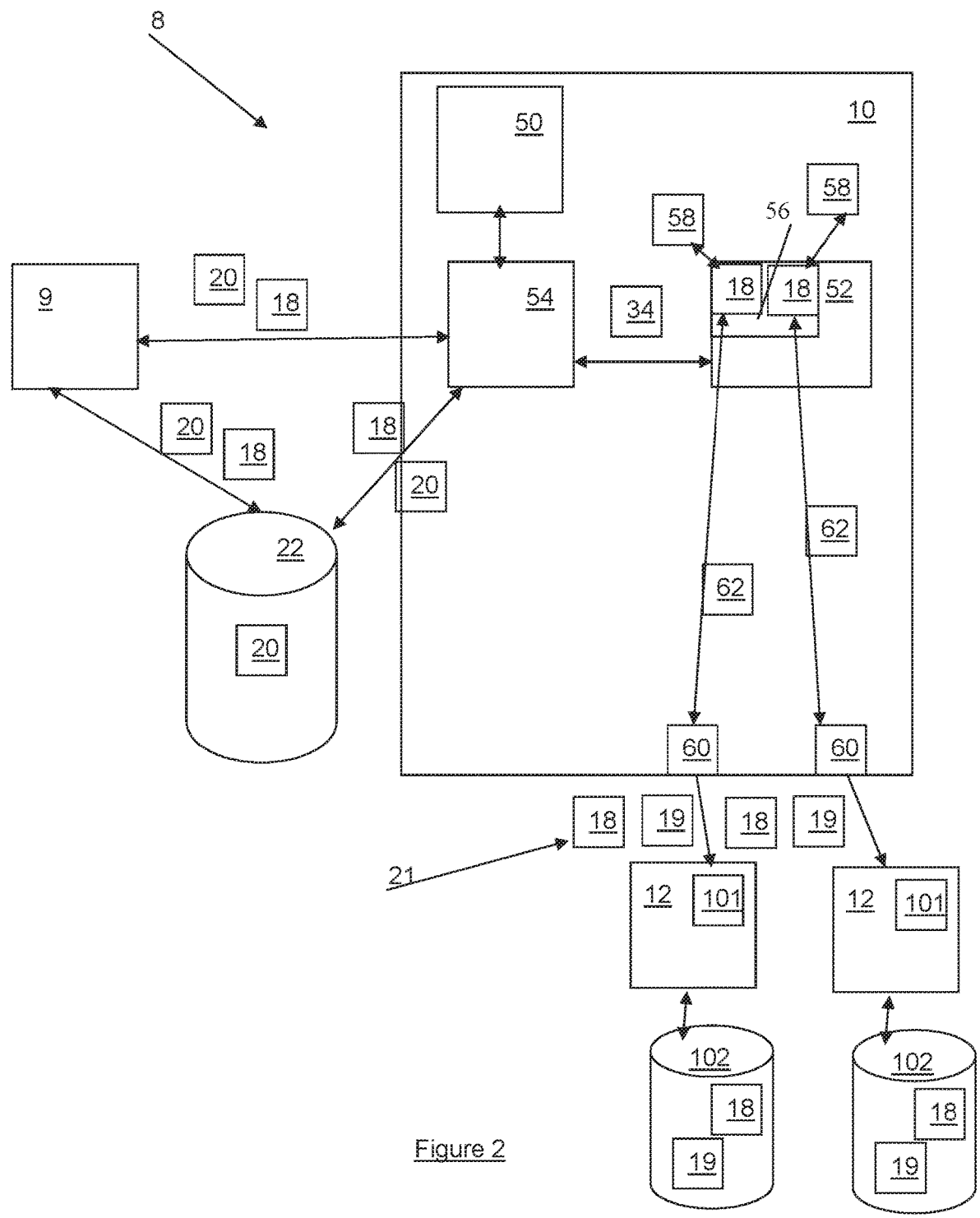
FIG. 2 is a block diagram of an example data server for the system of FIG. 1.

Referring to FIG. 2, the data server 10 includes a computer processor 50 and associated memory 52 for implementing a series of rules 54 stored in memory 52 for receiving the event driven data 20, for processing of the event driven data 20 into the target data 21, and sending the target data 21 to the network client device 12. The rules 54 can define can the process of extracting the event driven data 20 from the database 22 and/or can define receiving of the event driven data 20 from an intermediate entity 9 (e.g. a database management server), such that the intermediate entity 9 is responsible for the physical read/write operations with respect to the records of the database 22. Also provided for is update data 18 that can be, as per the rules 54, extracted from the database 22 and/or obtained via the intermediate entity 9, as further described below. In terms of the update data 18, this data 18 can be received and stored in a local message queue 56 of the memory 52, as defined in the rues 54 as executed by the computer processor 50). The update data 18 in the message queue 56 can be associated with a client identifier 58 (recognising that the message queue 56 can contain multiple update data 18 bound for different network client devices 12) associated with the network client device 12. The message queue 56 is coupled to a web socket 60 (i.e. Web Socket 60 is defined as a computer communications protocol, providing a persisted full-duplex communication channel over a single TCP connection of the network 11) by a coupling program 62 (e.g. one or more coroutines 62) configured for identifying contents of the message queue 56 associated with the respective network client device 12 (e.g. via the client identifier 58) and pushing the identified data in the message queue 56 as the target data 21 containing the update data 18. In any event, the update data 18 is considered to contain data portions of the event driven data 20 of the database 22 that can be used by the network application 101 of the network client device 12 to modify the historical data set 19 (a set of content from the event driven data 20) previously received from the data server 10, such that the network application 101 has in effect an updated or real-time (or near real-time) version of the event driven data 20 stored in local memory 102 of the network client device 12. As such, as further provided below, the terms coupling program 62, coroutine 62 and threading 62 can be used interchangeably as apparent to a person skilled in the art.

Examples of Event Driven Data 20

Registration and maintenance of domain names involves management of objects associated with each of the domain names stored as the event driven data 20 in the database 22, for example associated with a domain name registry. These objects are populated with appropriate data based on action (s) (e.g. events) performed on the objects (e.g. update/modification, delete/del, transfer, renew, etc.). Example actions on the objects for the domain name are such as registration/purchase of the domain name by a registrant from the registrar. Other example actions on the objects can include management by a Registry Operator of up-to-date data in the objects concerning domain name and name server registrations maintained by the Registry Operator, useful in verifying and providing operational stability of Registry Services and the DNS.

The specification of the content and format of this data of the objects can be such as but not limited to:

1. Registrar objects. The registrar object corresponds to a single registrar. It includes the following data:

Registrar ID (conforming to the IANA registrar-ids registry)

Contact ID of Registrar

Registrar Administrative Contacts

Registrar Technical Contacts

Registrar Billing Contacts

Registrar URL

Registrar Creation Date

Registrar Last Updated Date

2. Contact objects. The contact object corresponds to a single contact (whether registrant, administrative, technical or billing contact). The contact object includes the following data:
Contact ID
Contact Name
Contact Organization
Contact Address, City, State/Province, Country
Contact Postal Code
Contact Phone, Fax, E-mail
3. Nameserver objects. A nameserver object corresponds to a single registered nameserver. The nameserver object includes the following data:
Name Server ID
Name Server Host Name
Name Server IP Addresses if applicable
Current Registrar
Name Server Creation Date
Name Server Last Updated Date
4. Domain objects. The domain object corresponds to a single Registered Name. Each domain object includes the following data:
Domain ID
Domain Name
Sponsoring Registrar
Domain Status
All contact information (including all details) with at least one each of:
   Registrant
   Administrative
   Technical
   Billing
All nameservers associated with this domain
Domain Registration Date
Domain Expiration Date
Domain Last Updated Date An action/event can be defined as an operation on an object unique to each of the plurality of domain names of the DNS, realizing that each of the plurality of the domain names. An example action can be assigning the domain names to a new domain name registrant. Alternative actions can include actions such as but not limited to check, info/status, update/mod, delete/del, transfer, and/or renew. As such, the event driven data 20 representing such actions is stored in database 22 and database 9, as well as sent to the server 10 as the update data 18 for storage in the message queue 56.

The action can be based on a protocol such as Extensible Provisioning Protocol (EPP) or Registry Registrar Protocol (RRP). The Extensible Provisioning Protocol (EPP) is a flexible protocol designed for allocating objects within registries over the Internet. EPP provides a robust and flexible protocol that facilitates transaction communications between domain name registry service providers and domain name registrars. These transactions are used whenever a domain name is acted upon using actions such as to effect data content of the domain name objects to reflect registered, transferred, renewed or otherwise amended domain names, as reflected in the event driven data 20 of the database 22. As such, the EPP protocol can be used to implement an order (request action on an object) and fulfilment (perform and report result of object when acted upon) system. Specified in XML, EPP provides four basic service elements: a greeting, commands (e.g. actions), responses (e.g. to the actions effecting changes to data content of the objects associated with the actions), and an extension framework that supports future definition of managed objects and the relationship of EPP protocol requests (e.g. actions) and responses to those objects. It is recognised that actions of EPP are expressed as XML, a structured, text-based format, such that communication over the network 11 of the actions between entities involved (e.g. registrar, registry, registrant) can be specified over TCP communication messaging and/or other transport communication messaging such as BEEP, SMTP, or SOAP.

The registry databases 22 can also contain a transaction log/history (e.g. EPP) containing all operations (a consequence of actions) executed on the objects of the domain names, such that the log/history indicates the domain name by domain name ID along with details of the operation(s) (e.g. time of transaction, success of transaction, type of operation, etc.). EPP commands fall into three categories: session management commands, query commands, and data transform commands. Session management commands are used to establish and end sessions with an EPP server. Query commands are used to perform read-only, object-based information retrieval operations with respect to data contents of the objects. Transform commands are used to perform read-write object management operations with respect to the data contents of the objects 15. EPP provides commands to manage sessions, retrieve object information, and perform transformation operations on objects. All EPP commands are atomic and idempotent, either succeeding completely or failing completely and producing predictable results in case of repeated execution. EPP provides three commands/actions to retrieve object information: action <info> to retrieve detailed information associated with a known object, action <ping> to determine if an object is known to the server, and action <transfer> to retrieve known object transfer status information. EPP provides five commands/actions to transform (i.e. modify the data contents of the object) objects in the database 22: action <create> to create an instance of an object within the database 22, action <delete> to remove an instance of an object from the database 22, action <renew> to extend the validity period of an object in the database 22, action <update> to change information associated with an object in the database 22, and action <transfer> to manage changes in client sponsorship (e.g. change in registrant 12) of a known object in the database 22. As such, instance of an object refers to the specific data contents of an object.

A DNS query can be defined as the process of a computer or networking device making an inquiry (i.e. for a request for a domain name name or uniform resource locator (URL)) to get an IP address for a DNS name such as w3.org. For example, a client computer can send a DNS query to one of their Internet service provider's DNS servers. The DNS server looks in it's DNS database to tell whether it can answer the query authoritatively. If the DNS server can answer authoritatively, the DNS server answers the query and the DNS query process is complete. If the server cannot answer the query authoritatively it will look in its DNS cache of previous queries. If the DNS server finds a matching entry in its cache, it will answer the query with a non-authoritative answer based on the information in its cache and the DNS query process is complete. If the ISP DNS server did not have the DNS information in its DNS database or its DNS cache the DNS query process will use recursion to complete the DNS query. The ISP DNS server will use its root hints file to find information to contact other DNS servers. As such, parameters (such as the QNAME, QTYPE, QCLASS, timestamp or source network)) or events (such as NXDOMAIN) associated with the DNS queries can be stored in the database 22 as the event driven data 20.

Coroutines

Coroutines 62 are computer program components that can be defined in the rules 54 as executed by the computer processor of the data server 10. The coroutines 62 are defined as generalized subroutines for non-preemptive multitasking, by allowing multiple entry points for suspending and resuming execution at certain locations. The coroutines 62 are well-suited for implementing a direct coupling between message queue 56 contents and the web sockets 60 as further described below. It is recognised that coroutines 62 and concurrency are largely orthogonal, and as such, the coroutines 62 are executed by the computer processor 50 as a general control structure whereby flow control is cooperatively passed between two different routines without returning. For example, when subroutines are invoked, execution begins at the start, and once a subroutine exits, it is finished; an instance of a subroutine only returns once, and does not hold state between invocations. On the contrary, advantageously, the coroutines 62 can exit by calling other coroutines 62, which may later return to the point where they were invoked in the original coroutine 62 (e.g. from the coroutine's 62 point of view this is not exiting but calling another coroutine). Thus, the coroutine 62 instance holds state, and varies between invocations, such that there can be multiple instances of a given coroutine 62 at once. The difference between calling another coroutine 62 by means of "yielding" to it and simply calling another routine (which then, also, would return to the original point), is that the relationship between two coroutines 62 which yield to each other is not that of caller-callee, but instead symmetric.

In terms of the message queue 56, this queue is used to contain the target data 21 (e.g. update data 18 extracted from the databases 20 by the data server 10. For example, it is realized that the network client device 12 previously requested from the data server some event driven target data 20. The data server 10 would have served this as the target data 21 to the network client device 12 and then would have begun monitoring the databases 20 for any updates (e.g. modifications to the previously sent target data 21). As the update data 18 is identified by the data server 10 in the databases 22, this update data 18 is loaded into the message queue 56. It is also recognised that the data server 10 could instruct a third party device (e.g. computer hosting the databases 22) to load the message queue 56 with the update data 18 (i.e. modifications to the original target data 21 to the network client device 12 by the data server 10). As further discussed below, any data 18, 19 resident in the message queue 56 is available to the coroutines 62 connected to the websocket 60 associated with the network client device 12. It is recognised that the message queue 56 could be hosted by the data server 10 itself and/or the message queue 56 could be hosted by a remote device and thus accessed by the data server 10 over the network 11. Accordingly, as further described below, generally speaking, the message queue 56 is a service that provides the update data 18, and the data server 10 is a service that couples the message queue 56 (associated with the network target device 12) to the websocket(s) 60 (also coupled to the network target device 12—via the network 11) via the coroutines 62.

Provided below is a simple example of how the coroutines 62 can be used to directly couple the contents of the message queue 56 with the web socket 60 connected to the network client device 12. For example, the rules 54 can be defined such that one storage program (e.g. of a third party device and/or of the data server 10) creates storage items (e.g. event driven data 20 received by the data server 10 as the update data 18) and adds these storage items to the message queue 56 and a retrieval coroutine 62 removes these items (e.g. as identified by the client identifier 58) from the message queue 56 and passes them, once identified, to the particular web socket 60 associated with the retrieval coroutine 62. For example, the retrieval coroutine 62 can be defined as a message queue content retrieval program for only those contents tagged with the client identifier 58 that is assigned to the respective web socket 60 connected to the respective network client device 12. In this example manner, the contents of the message queue 56 intended for the respective network client device 12 (as assigned the client identifier 58) are distributed from the message queue 56 and to the web socket 60 assigned to the respective network client device 12. An example of the coroutines 62 is as follows.

```
coroutine history
    for requested history
        yield read history from database 9
        yield write to websocket
coroutine events
    loop
        if queue is not empty
            yield read from queue
            yield write to websocket
main loop
    if request is for history
        yield coroutine history
    if request is for events
        yield coroutine events
```

Although this example is often used to introduce multi-threading, two threads are not needed for this: the yield statement can be implemented by a jump directly from one routine into the other.

In general, a coroutine 62 can be similar to a thread (in the sense of multithreading): it is a line of execution, with its own stack, its own local variables, and its own instruction pointer; but it shares global variables and mostly anything else with other coroutines 62. The main difference between threads and coroutines is that, conceptually (or literally, in a multiprocessor machine), a program with threads runs several threads in parallel. Coroutines 62, on the other hand, are collaborative: at any given time, a program with coroutines 62 is running only one of its coroutines 62, and this running coroutine 62 suspends its execution only when it explicitly requests to be suspended. So during coroutine A's execution, it passes control to coroutine B. Then after some time, the coroutine B passes control back to coroutine A. Since there is dependency between coroutines 62, and they must run in tandem, so the two coroutines 62 are not concurrency as executed by the computer processor 50.

Accordingly, the coroutines 62 program as well as a threading program can both be referred to generically as a coupling program 62, which is defined as a set of instructions for programming the computer processor 50 to retrieve any available update data 18 from the message queue 56 and to forward the retrieved update data 18 to the web socket 60 associated with the particular network client device 12. As a version of the coupling program 62, the coroutines 62 can be advantageous in that they allow the data server 10 to scale with respect to the number of network client device 12 the data server 10 can support (e.g. via individually assigned web socket(s) 60 to the particular network client device 12. As discussed, as alternative to the coroutines 62 for this implementation are the threading 62 that multiplex between network client device 12 and the data server 10 over the network 11. However, it is recognised that the upper limit on the number of threads 62 is lower than the limiting factor for coroutines 62, which are the number of open websockets 60 the data server 10 can support. For example, using coroutines 62 can facilitate for fewer data servers 10 to serve the same number of network client devices 12 over the network 11 when compared to threading 62.

As such, the coupling program 62 (e.g. coroutine(s) 62 and/or threading 62) can be used to take messages (e.g. update data 18) resident in the message queue 56 (as tagged for the particular network client device 12 such as by using the client identifier 58 of the particular network client device 12) and to send them (i.e. the update data 18) to the web socket(s) 60 associated with the network client device 12 (i.e. having the same client identifier 58).

The network client device 12 can combine (e.g. using first metadata and second metadata as described) the update data 18 with the historical event driven data 19 in a storage local to a network application executing on the network client device 12, such that the network application is configured for displaying the combined data on a display of the network client device 12. The contents of the local storage can correspond to the contents of the database containing the historical event driven data and any of the update data applied thereto.

Web Sockets

Web sockets 60 as provided above are used by the system 8 to provide a persistent, low latency connection that can support transactions initiated by either the network client device 12 or the data server 10. As such, the Web Socket 60 is defined as a computer communications protocol, providing full-duplex communication channels over a single TCP connection of the network 11. One end of the web socket 60 is provisioned (e.g. created) on the data server 10 side of the network 11 and the other end of the web socket is provisioned on the network client device 12 side of the network 11. As such, the created Web Sockets 60 provide a persistent connection between the network client device 12 and the data server 10 that both parties can use to start sending data (e.g. target data 21 as per the data server 10 and data requests as per the network client device 12) at any time (e.g. as a pull or push).

It is recognized that Web Socket 60 is designed to be implemented in web browsers (e.g. network application 101) and web servers (e.g. data server 10), but Web Socket 60 can be used by any client or server application. The Web Socket Protocol can be defined as an independent TCP-based protocol, as provided for in the rules 54. The only relationship to HTTP is that a handshake of the Web Socket creation request (e.g. from the network client device 12) is interpreted by HTTP servers as an Upgrade request. The Web Socket protocol makes interaction between a browser 101 and a web server 10 possible for provision of the update data 18 as a push operation, facilitating real-time data transfer from and to the server 10. This is made possible by providing a standardized way for the server 10 to send content (target data 21) to the browser 101 without being solicited by the client 12, and allowing for messages to be passed back and forth while keeping the connection on the network 11 open. In this way, a two-way (bi-directional) ongoing conversation over the network 11 can take place between the browser 101 and the server 10. For example, the communications (data requests and target data 21 transmission) can be done over TCP port number 80 (or 443 in the case of TLS-encrypted connections), which is of benefit for those environments which block non-web Internet connections using a firewall. Similar two-way browser-server communications have been achieved in non-standardized ways using stopgap technologies such as Comet.

In terms of implementation by the computer processor 50 of the server 10, the network client device 12 establishes a Web Socket 60 connection through a process known as the Web Socket handshake. This process starts with the network client device 12 sending a regular HTTP request to the server 10 over the network 11. An Upgrade header can be included in this request that informs the server 10 that the network client device 12 wishes to establish a Web Socket connection on the network 11. If the server 10 supports the WebSocket protocol, the server 10 agrees to the upgrade and communicates this through an Upgrade header in the response back to the network client device 12. Now that the handshake is complete, the initial HTTP connection is replaced by a Web Socket 60 connection that uses the same underlying TCP/IP connection. At this point either party can starting sending data. The handshake resembles HTTP so that server 10 can handle HTTP connections as well as Web Socket 60 connections on the same port. Once the connection is established, communication switches to a bidirectional binary protocol that does not conform to the HTTP protocol. It is recognized that the server 10 upon establishment of the web socket 60 with the network client device 12, also assigned an identifier (e.g. client identifier 58) to the web socket 60 of the respective network client device 12 and also configures and assigns specific coroutines 62 to identify content of the message queue 56 associated of otherwise linked to the specific client identifier 58.

In general, via the Web Sockets 60, the server 10 can transfer target data 21 without incurring overhead associated with traditional HTTP requests. The target data 21 (i.e. historical data 19, update data 18) is transferred through a WebSocket 60 as messages (the content of which is supplied by the coroutines 62 assigned to the particular web socket 60 of the client device 12), each of which consists of one or more frames containing the data being set (the target data 21 payload). In order to provide that the message can be properly reconstructed when it reaches the client device 12 each frame can be prefixed with data about the payload. This frame-based messaging system can help to reduce the amount of non-payload data that is transferred, leading to significant reductions in latency and therefore to assist in providing real time update data 18. Once the connection (e.g. web socket 60) is established, the client device 12 and server 10 can send data 21 or text frames back and forth in full-duplex mode over the network 11. Web Socket 60 transmissions can be a single message optionally split across several data frames of the target data 21. This splitting can allow for sending of messages where initial data is available but the complete length of the message is unknown (it sends one data frame after another until the end is reached and marked with the FIN bit). With extensions to the protocol, this can also be used for multiplexing several streams simultaneously (for instance to avoid monopolizing use of a socket for a single large payload).

As described above, the data server 10 utilizes a web socket 60 configuration for providing access to a remote storage database 22 by a network client device 12 over a communications network 11, the database 22 containing event driven data (e.g. update data 18 and historical data 19), the data server 10 including: an interface to the database 22 containing the event driven data 20; a message queue 56 (or access to the message queue 56 hosted on a remote computer) for receiving and storing updates (i.e. update data 18) of the event driven data 20 of the database 22; a computer processor 50 and memory having stored instructions for execution by the computer processor 50 to: establish by the computer processor 50 a websocket 60 connection with the network client device 12 upon request of the network client device 12, the websocket 60 connection providing a persistent network connection between the server 10 and the network client device 12 for communicating network messages; link by the computer processor 50 a set of instructions as a coupling program 62 providing a direct coupling between the message queue 56 and the websocket 60 connection; receive by the computer processor 50 a query request from the network client device 12 for a requested portion of the event driven data 20, apply the query request to the database 22 and send a query response containing the requested portion (e.g. also referred to as historical data 19) of the event driven data 20 to the network client device 12, contents of the query response representing historical event driven data 19; subsequent to said send the query response, operate by the computer processor 50 the coupling program 22 such that update data 18 of the event driven data 20 resident in the message queue 56 is passed to the websocket 60 connection by the coupling program 62 and sent to the network client device 12 as an update data message containing the update data 18 representing real-time changes to the historical event driven data 19; wherein the update data 18 is associated with the requested portion of the event driven data 20 such that the update data 18 represents a data subset of the requested portion.

It is further envisioned that the update data message can contain first metadata associated with the update data 18, the first metadata corresponding to second metadata associated with the historical event driven data 19; wherein the network client device 12 matches the first metadata with the second metadata in order to update corresponding portions of the historical event driven data 19 matching the update data 18 (e.g. using a web browser of the network client device 12).

Examples of the event driven data 20 can be such as but not limited to: domain name registry transactional data containing transactions selected from the group consisting of: create; modify; delete; and transfer. A further example is where the event driven data 20 is domain name server query transactions associated with a domain name of the event driven data 20. A further example is where the event driven data 20 is domain name server query transactions associated with a DNS zone or events associated with the query request. A DNS zone can be referred to as a construct of the Domain Name System (DNS) defining a domain namespace, which specifies Top Level Domains (such as ".info"), second-level domains, (such as "afilias.info") and lower-level domains, also called subdomains (such as "support.afilais.info"). Each of these levels can be a DNS zone.

As an example of providing the update data 18, the updates of the domain name registry transactional data can be obtained for the message queue 56 from a database 22 server responsible for managing the domain name registry transactional data contained in the database 22, the database 22 server coupled to the data server 10 over the communications network 11 via the interface. It is also recognised that message data (stored in the message queue 56) can also be stored in the database 22 as part of the historical data 19.

The above described system can include a plurality of web sockets 60, each of the plurality of web sockets 60 connected to a respective client network device 12 of a plurality of client network devices 12 and the coupling 62 program can be a coroutine 62. In such an example, the data server 10 can have a plurality of coroutines 62, such that each respective coroutine 62 of the plurality of coroutines 62 provides a respective direct coupling between the message queue 56 and the respective web socket 60 of the plurality of web sockets 60.

What is claimed is:

1. A server having a web socket configuration for providing access to a remote storage database by a network client device over a communications network, the database containing event driven data, the server including:
    an interface to the database containing the event driven data;
    a message queue for receiving and storing updates of the event driven data of the database;
    a computer processor and memory having stored instructions for execution by the computer processor to:
    establish by the computer processor a websocket connection with the network client device upon request of the network client device, the websocket connection providing a persistent network connection between the server and the network client device for communicating network messages;
    link by the computer processor a set of instructions as a coupling program providing a direct coupling between the message queue and the websocket connection;
    receive by the computer processor a query request from the network client device for a requested portion of the event driven data, apply the query request to the database and send a query response containing the requested portion of the event driven data to the network client device, contents of the query response representing historical event driven data; and
    subsequent to said send the query response, operate by the computer processor the coupling program such that update data of the event driven data resident in the message queue is passed to the websocket connection and sent to the network client device as an update data message containing the update data representing real-time changes to the historical event driven data;
    wherein the update data is associated with the requested portion of the event driven data such that the update data represents a data subset of the requested portion.

2. The server of claim 1 further comprising the update data message containing first metadata associated with the update data, the first metadata corresponding to second metadata associated with the historical event driven data; wherein the network client device matches the first metadata with the second metadata in order to update corresponding portions of the historical event driven data matching the update data.

3. The server of claim 1, wherein the event driven data is domain name registry transactional data containing transactions selected from the group consisting of: create; modify; delete; and transfer.

4. The server of claim 1, wherein the event driven data is domain name server query transactions associated with a DNS zone or events associated with the query request.

5. The server of claim 3, wherein the updates of the domain name registry transactional data are obtained for the message queue from a database server responsible for managing the domain name registry transactional data contained in the database, the database server coupled to the server over the communications network via the interface.

6. The server of claim 5, wherein the database server sends the updates to the server after modifying the corresponding domain name registry transactional data in the database.

7. The server of claim 1 further comprising a plurality of websockets, each of the plurality of websockets connected to a respective client network device of a plurality of client network devices and the coupling program is a coroutine.

8. The server of claim 7 further comprising a plurality of coroutines, such that each respective coroutine of the plurality of coroutines provides a respective direct coupling between the message queue and the respective websocket of the plurality of websockets.

9. The server of claim 2, wherein the first metadata and the second metadata are configured for processing by a web browser as a network application of the network client device.

10. The server of claim 2, wherein the network client device combines using the first metadata and the second metadata the update data with the historical event driven data in a storage local to a network application executing on the network client device configured for displaying the combined data on a display of the network client device; wherein the contents of the local storage correspond to the contents of the database containing the historical event driven data and any of the update data applied thereto.

11. The server of claim 2, wherein a network application executing on the network client device is configured to apply queries against a local storage containing the historical event driven data updated by the update data.

12. A method implemented using a web socket configuration to provide access to a remote storage database by a network client device over a communications network, the database containing event driven data, the method including:

interfacing to the database containing the event driven data;

receiving and storing updates of the event driven data of the database in a message queue;

establishing by a computer processor a web socket connection with the network client device upon request of the network client device, the web socket connection providing a persistent network connection between the server and the network client device for communicating network messages;

linking by the computer processor a set of instructions as a coupling program providing a direct coupling between the message queue and the websocket connection;

receiving by the computer processor a query request from the network client device for a requested portion of the event driven data, apply the query request to the database and send a query response containing the requested portion of the event driven data to the network client device, contents of the query response representing historical event driven data; and subsequent to said send the query response, operating by the computer processor the coupling program such that update data of the event driven data resident in the message queue is passed to the websocket connection and sent to the network client device as an update data message containing the update data representing real-time changes to the historical event driven data;

wherein the update data is associated with the requested portion of the event driven data such that the update data represents a data subset of the requested portion.

* * * * *